US009669423B2

(12) United States Patent
Choi et al.

(10) Patent No.: US 9,669,423 B2
(45) Date of Patent: Jun. 6, 2017

(54) MULTI-TIP SPARK DISCHARGE GENERATOR AND METHOD FOR PRODUCING NANOPARTICLE STRUCTURE USING SAME

(71) Applicants: Global Frontier Center for Multiscale Energy Systems, Seoul (KR); SNU R&DB Foundation, Seoul (KR)

(72) Inventors: Man Soo Choi, Seoul (KR); Kyungyeon Ha, Seoul (KR); Hoseop Choi, Seoul (KR); Kyuhee Han, Gyeonggi-do (KR); Kinam Jung, Seoul (KR); Dongjoon Lee, Wonju-si (KR); Sukbyung Chae, Sejong (KR)

(73) Assignees: Global Frontier Center—Multiscale Energy Systems, Seoul (KR); SNU R&DB Foundation, Seoul (KR)

( * ) Notice: Subject to any disclaimer, the term of this patent is extended or adjusted under 35 U.S.C. 154(b) by 399 days.

(21) Appl. No.: 14/351,476

(22) PCT Filed: Dec. 19, 2013

(86) PCT No.: PCT/KR2013/011884
§ 371 (c)(1),
(2) Date: Apr. 11, 2014

(87) PCT Pub. No.: WO2014/148727
PCT Pub. Date: Sep. 25, 2014

(65) Prior Publication Data
US 2015/0030781 A1    Jan. 29, 2015

(30) Foreign Application Priority Data

Mar. 22, 2013 (KR) ........................ 10-2013-0030610
Aug. 30, 2013 (KR) ........................ 10-2013-0104456

(51) Int. Cl.
*B05B 5/025* (2006.01)
*B05D 1/06* (2006.01)
(Continued)

(52) U.S. Cl.
CPC .............. *B05D 1/06* (2013.01); *B01J 19/088* (2013.01); *G21B 3/006* (2013.01);
(Continued)

(58) Field of Classification Search
CPC . G21B 3/006; B01J 19/088; B01J 2219/0879; B01J 2219/0809;
(Continued)

(56) References Cited

U.S. PATENT DOCUMENTS 5,102,523 A    4/1992  Beisswenger et al.
5,153,519 A *  10/1992 Wentworth ............ G01N 27/70
                                                      324/123 R
(Continued)

FOREIGN PATENT DOCUMENTS

JP    2008-150679 A    7/2008
KR    10-2009-0089787 A    8/2009
KR    10-2012-0007823 A    1/2012

OTHER PUBLICATIONS

Ha et al. "Large-Area Patterning of Three-dimensional Nanoparticle Structure Arrays via Ion Assisted Aerosol Lithography (IAAL) and Multi-tip Spark Discharge" presented at European Aerosol Conference Sep. 2013.*
(Continued)

*Primary Examiner* — Robert S Walters, Jr.
(74) *Attorney, Agent, or Firm* — Christensen, Fonder, Dardi & Herbert PLLC; Peter S. Dardi

(57) ABSTRACT

The present invention relates to a spark discharge generator. The spark discharge system of the present invention includes a plurality of columnar electrodes and a ground plate having
(Continued)

a plurality of outlet holes at positions corresponding to the columnar electrodes. The use of the spark discharge generator enables the production of a three-dimensionally shaped nanostructure array on a large area in a uniform and rapid manner.

10 Claims, 6 Drawing Sheets

(51) Int. Cl.
    *B01J 19/08*     (2006.01)
    *G21B 3/00*     (2006.01)
    *B82Y 40/00*     (2011.01)

(52) U.S. Cl.
    CPC .. *B01J 2219/083* (2013.01); *B01J 2219/0809* (2013.01); *B01J 2219/0813* (2013.01); *B01J 2219/0815* (2013.01); *B01J 2219/0822* (2013.01); *B01J 2219/0828* (2013.01); *B01J 2219/0839* (2013.01); *B01J 2219/0841* (2013.01); *B01J 2219/0843* (2013.01); *B01J 2219/0849* (2013.01); *B01J 2219/0869* (2013.01); *B01J 2219/0879* (2013.01); *B82Y 40/00* (2013.01)

(58) Field of Classification Search
    CPC ........ B01J 2219/0813; B01J 2219/0815; B01J 2219/0822; B01J 2219/0828; B01J 2219/083; B01J 2219/0839; B01J 2219/0841; B01J 2219/0843; B01J 2219/0849; B01J 2219/0869; B05D 1/06; B82Y 40/00
    See application file for complete search history.

(56) References Cited

U.S. PATENT DOCUMENTS

2005/0106329 A1     5/2005     Lewis et al.
2008/0241422 A1    10/2008    Hwang et al.

OTHER PUBLICATIONS

International search report and written opinion from application No. PCT/KR2013/011884 dated Apr. 3, 2014.

* cited by examiner (a)

(b)

(c)

(a)

(b)

(c)

0.03 m/s    0.06 m/s    0.09 m/s

MULTI-TIP SPARK DISCHARGE GENERATOR AND METHOD FOR PRODUCING NANOPARTICLE STRUCTURE USING SAME

CROSS REFERENCE TO RELATED APPLICATIONS

This application is a national stage filing of PCT application number PCT/KR2013/011884 filed on Dec. 19, 2013, which claims priority to Korean Patent Application Numbers 10-2013-0030610 filed Mar. 22, 2013 and 10-2013-0104456 filed Aug. 30, 2013, all of which are hereby incorporated herein by reference.

TECHNICAL FIELD

The present invention relates to a spark discharge generator and a method for producing a nanoparticle structure using the same.

BACKGROUND ART

Nanopatterning is a technique in which charged nanoparticles are deposited at desired locations under selective control to produce micro- and nano-sized structures. Nanopatterning is expected to be useful in the development of quantum devices and nano bio devices that will play leading roles in next-generation industries.

As an example of such techniques for patterning charged nanoparticles, a method is known in which a substrate is charged using an electron or ion beam, followed by deposition of oppositely charged nanoparticles. However, this method is time-consuming because the substrate is charged in a series mode. Since the substrate surface is charged using an electron or ion beam, the substrate is required to be non-conductive.

Another technique is known in which a photoresist is formed on a support and is patterned by a suitable process such as photolithography, and then only charged nanoparticles are induced into and deposited on the pattern using an electrostatic force without an ion accumulation process. This technique enables patterning of high-purity nanoparticles prepared in the vapor state but does not accumulate ions on the photoresist pattern, leaving a considerable number of nanoparticles deposited at undesired locations, i.e. on the photoresist surface, as well as on the electrically conducting substrate.

Among many vapor-phase synthesis methods, spark discharge is an efficient method for preparing nano-sized particles. Spark discharge generates a charged aerosol using a simple system, thus being useful for the assembly of nanostructures. There have been various types of methods for spark discharge. The most widely used rod-to-rod type has recently been employed for the synthesis of bimetallic or mixed-metal nanoparticles or the growth of nanowires. Spark discharge generators are known to generate nano-sized particles. However, charged aerosols having a size of 10 nm or less tend to cause electrostatic aggregation of bipolar nanoparticles. To prevent such aggregation of nanoparticles and to generate smaller-sized charged aerosols are essential in the use of spark discharge generators.

There are known methods for reducing the aggregation of particles in spark discharge generators by varying operational parameters such as spark frequency, spark energy, and carrier gas flow.

In such an effort, the present applicant has proposed a method for producing a two- or three-dimensionally shaped nanoparticle structure by focused patterning of nanoparticles (see Korean Patent Publication No. 10-2009-0089787, which was published on Aug. 24, 2009). According to this method, bipolar-charged nanoparticles and ions generated simultaneously by spark discharge of a pin-to-plate or tip-to-plate type electrode structure are fed into a reactor accommodating a patterned substrate, and an electric field is applied thereto to efficiently produce a two- or three-dimensionally shaped nanoparticle structure irrespective of the polarity of the nanoparticles or ions.

The pin-to-plate or tip-to-plate structure has an asymmetric structure consisting of a pin having a sharp tip, as an anode, and a ground plate having a central outlet. It is known that a charged aerosol generated by the pin-to-plate structure has a much smaller particle size, less aggregates, and has a narrower particle diameter distribution than that generated by a rod-to-rod structure.

However, pin-to-plate structures reported to date can form nanostructures only on limited areas, for example, areas having a diameter of about 8 mm or less. There is thus a need to develop a pin-to-plate structure that can form nanostructures on a large-area surface at a high speed for industrial application.

PRIOR ART DOCUMENTS

Patent Documents (Patent Document 1) Korean Patent Publication No. 10-2009-0089787 (published on Aug. 24, 2009)

DISCLOSURE

Technical Problem

Therefore, the present invention is directed to providing a spark discharge generator suitable for the formation of a uniform nanostructure on a large area at a high speed and a method for producing a nanostructure using the spark discharge generator.

Technical Solution

One aspect of the present invention provides a spark discharge generator including a discharge chamber having gas inlets and outlets, a plurality of columnar electrodes located in the discharge chamber, a ground plate located in the discharge chamber and having a plurality of outlet holes at positions corresponding to the columnar electrodes, and a substrate support located opposite the columnar electrodes and the ground plate.

According to a preferred embodiment of the present invention, each of the columnar electrodes may have a tip whose shape is sharp, rounded or flat towards the corresponding outlet hole of the ground plate.

Each of the tips of the columnar electrodes may be spaced a predetermined distance from the corresponding outlet hole of the ground plate, may be located at the same position as the corresponding outlet hole, or may penetrate the corresponding outlet hole.

The diameter of the outlet holes of the ground plate may be increased or decreased to adjust the flow rate at the outlets of the spark discharge generator so that the degree of aggregation of particles can be controlled.

According to a preferred embodiment of the present invention, the spark discharge generator may further include corona dischargers at the gas inlets.

According to a preferred embodiment of the present invention, the tips of the columnar electrodes may generate particles and ions simultaneously.

According to a preferred embodiment of the present invention, the spark discharge generator may further include an inner cylinder by which the distance between the ground plate and the substrate support and the inflow rate of gas at the gas inlets can be adjusted to control the degree of aggregation of particles.

Preferably, the spark discharge generator of the present invention uses a circuit including a plurality of resistors and a plurality of capacitors, as a constant high voltage source.

Preferably, the reaction chamber includes a window through which a user can see a spark discharge state.

Another aspect of the present invention provides a method for uniformly forming a three-dimensionally shaped nanostructure array on a large area using the spark discharge generator.

Advantageous Effects

The spark discharge generator of the present invention includes two or more columnar electrodes and a ground plate having a plurality of outlet holes corresponding to the columnar electrodes. Due to this structure, the spark discharge generator can effectively spray particles over a large area. Therefore, a large amount of the particles can rapidly move along an electric field formed over the entire region of a large-area substrate, enabling the production of a nanostructure on the large-area substrate in a rapid manner. In conclusion, according to the present invention, nanostructure array scan be produced on an industrially applicable scale by spark discharge.

MODE FOR INVENTION

The present invention will now be described in more detail with reference to the accompanying drawings.

Figure 1:
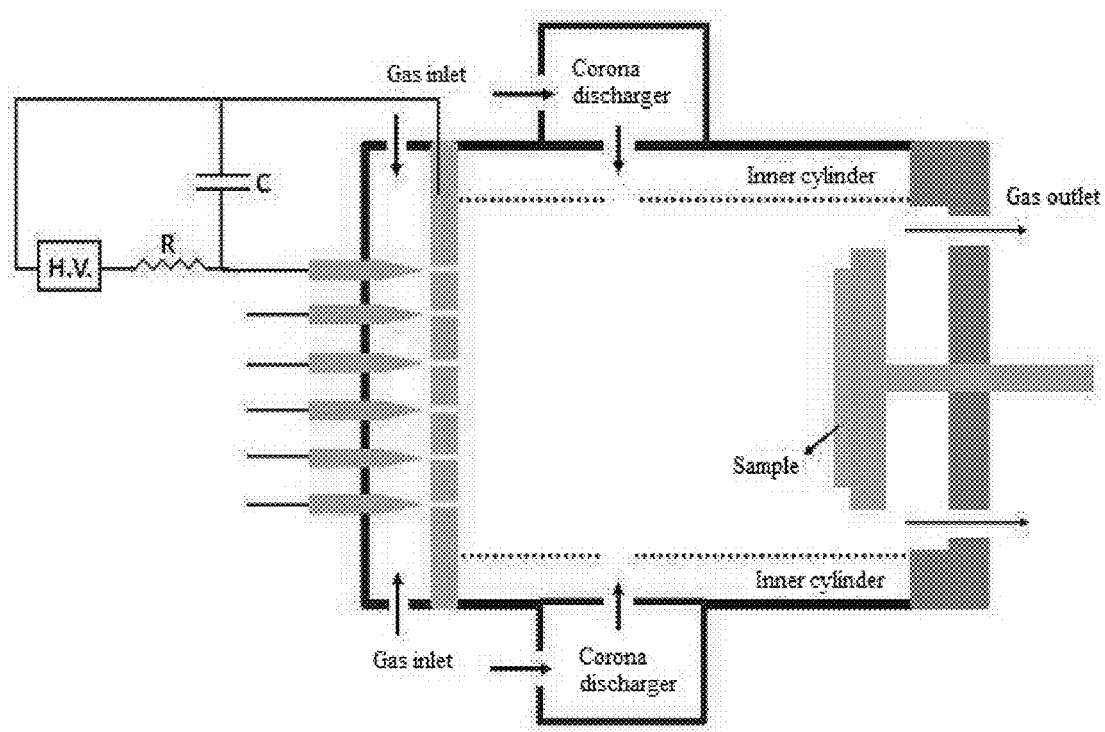
FIG. 1 is a schematic diagram of a spark discharge system according to a preferred embodiment of the present invention.

FIG. 1 is a schematic diagram of a spark discharge system according to a preferred embodiment of the present invention.

As illustrated in FIG. 1, the spark discharge system of the present invention includes a plurality of columnar electrodes and a ground plate having a plurality of outlet holes at positions corresponding to the columnar electrodes.

The columnar electrodes are intended to include pin electrodes, wire electrodes, and rod electrodes, and their shapes are not particularly limited.

Figure 2:
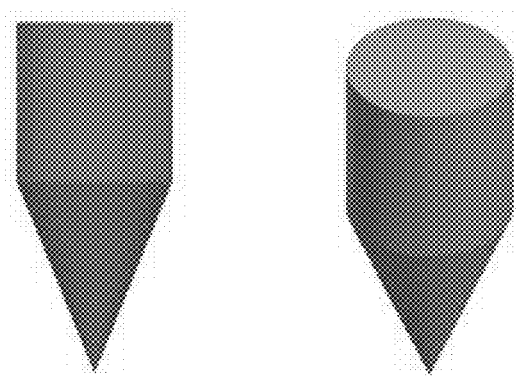
FIG. 2 schematically shows the shapes of tips of columnar electrodes according to exemplary embodiments of the present invention.
Figure 2:
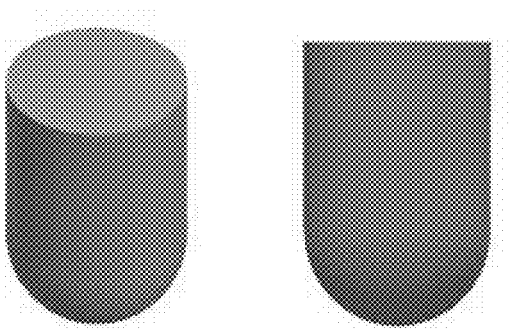
Figure 2:
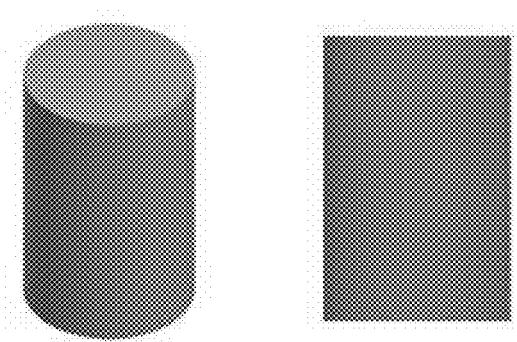

FIG. 1 illustrates pin electrodes as the columnar electrodes. The tips of the pin electrodes are sharp in shape but are not limited to this shape. Specifically, as shown in FIG. 2, the tips of the columnar electrodes may have various shapes, for example, (a) sharp, (b) rounded or (c) flat shapes.

The dimensions (e.g., diameter and length) of the columnar electrodes are not particularly limited and may be appropriately determined depending on the intended application or use.

For example, the diameter of each pin electrode may be from several microns to several millimeters, for example, from 0.01 to 20 mm, but is not limited to this range. The radius of curvature of each tip may be several microns to several millimeters, for example, 0.01 mm or more, but not limited hereto.

The outlet holes of the ground plate are formed so as to correspond to the respective columnar electrodes. The diameter of each outlet hole may be in the range of several microns to several millimeters, for example, 0.1 to 25 mm, but is not limited to this range. The diameter of each outlet hole may be increased or decreased to adjust the flow rate at the outlets of the spark discharge generator, so that the degree of aggregation of particles can be controlled.

No particular limitation is imposed on the distance between the columnar electrodes and the ground plate.

Figure 3:
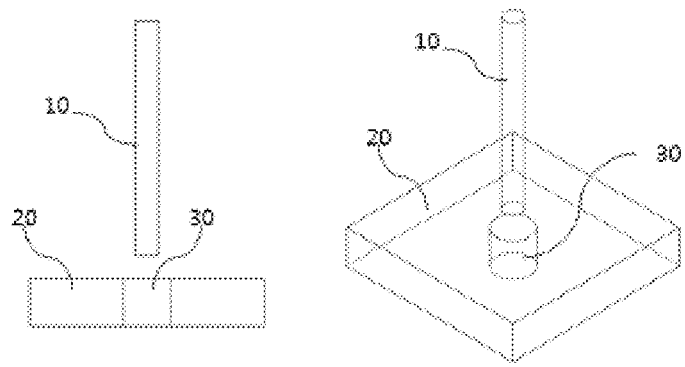
FIG. 3 schematically illustrates the relative positions of columnar electrodes and outlet holes of a ground plate in accordance with exemplary embodiments of the present invention.
Figure 3:
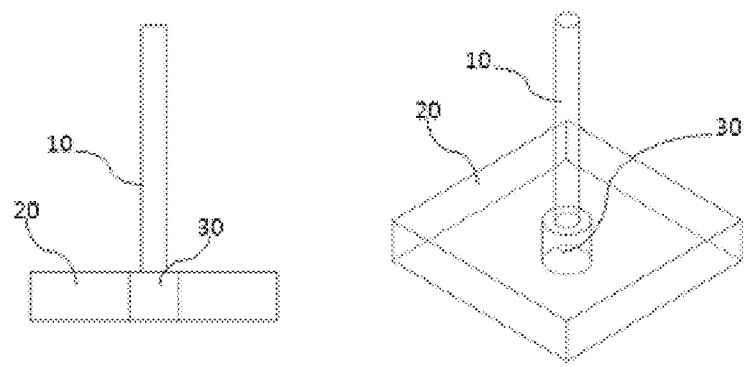
Figure 3:
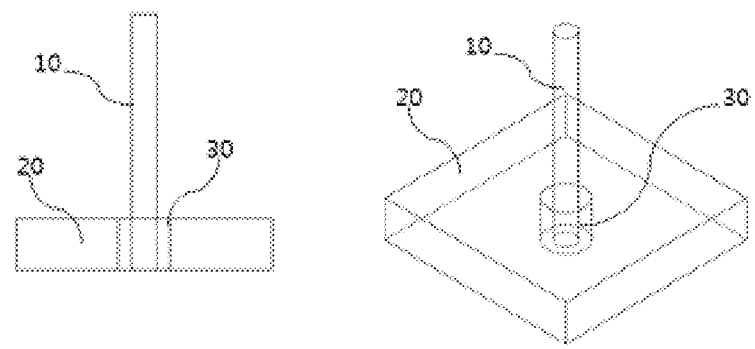

As illustrated in FIG. 3, (a) the columnar electrode 10 may be spaced a predetermined distance from the ground plate 20, (b) may be located at the same position as the ground plate 20, or (c) may penetrate the outlet hole 30 of the ground plate 20.

As illustrated in FIG. 3(a), the distance between the columnar electrode 10 and the outlet hole 30 of the ground plate may be from several microns to several tens of millimeters, for example, from 0.01 to 10 mm, but is not limited to this range.

On the other hand, in the case where the columnar electrode 10 and the ground plate 20 are located at the same position (FIG. 3(b)) or the columnar electrode 10 is inserted into or penetrate the outlet hole 30 of the ground plate 20 (FIG. 3(c)), the columnar electrode is arranged so as not to come into contact with the ground plate.

The number of the columnar electrodes is not limited. When one to three columnar electrodes are provided per 20 to 50 mm$^2$ of the substrate, a nanostructure can be uniformly formed over the entire area of the substrate.

A material for the columnar electrodes and the ground plate is not particularly limited. For example, the columnar electrodes and the ground plate may be made of a nanoparticle precursor. The nanoparticle precursor may be: a conductive material selected from the group consisting of gold, copper, tin, indium, ITO, graphite, and silver; a conductive material coated with a non-conducting material selected from the group consisting of cadmium oxides, iron oxides, and tin oxides; or a semiconducting materials elected from the group consisting of silicon, GaAs, and CdSe.

An electric circuit for spark discharge has a constant high voltage source structure including a high-voltage (HV) source, an external capacitor (C), and a resistor (R), but is not limited to this structure. If required, a circuit including a plurality of resistors and a plurality of capacitors may also be used for particle size control.

A method for producing a nanostructure array using a spark discharger is specifically disclosed in Korean Patent Publication No. 10-2009-0089787, and thus a detailed explanation thereof is omitted. For more effective ion generation and deposition, the system of the present invention may further include corona dischargers, as illustrated in FIG. 1. A voltage ranging from 1 kV to 10 kV may be applied to each corona discharger.

The flow rate of a carrier gas such as nitrogen, helium or argon can be determined by the diameter of the outlet holes of the ground plate inserted into the reactor, which becomes a parameter that can control the aggregation of particles to be generated by multi-spark.

The flow rate of a carrier gas such as nitrogen, helium or argon can be determined by the diameter of an inner cylinder inserted into the reactor, which becomes a parameter that can control the aggregation of particles to be generated by multi-spark.

The tips of the columnar electrodes may affect the formation of a structure due to their ability to generate particles and ions simultaneously. The tips of the columnar electrodes may have a sharp, rounded or flat shape as required.

In the system of the present invention, the distance between the plate electrode and a sample (or a substrate) may be adjusted to control the uniformity of a large-area nanostructure array and the area where the nanostructure is formed.

The moving path of particles can be controlled by varying the positions of the inlets through which gas flows into the multi-spark discharge generator. According to a preferred embodiment of the present invention, the gas inlets and outlets may be provided in plurality. In this case, a uniform nanostructure can be advantageously formed on a large-area substrate. As an alternative, the moving path of particles can be controlled by varying the positions of the inlets and outlets.

Preferably, the system of the present invention includes a window through which a user can see a spark discharge state and the sample (or substrate) is located at the center of the chamber.

The system of the present invention can be conveniently used to form a three-dimensionally shaped nanostructure array on a large area, for example, an area of 0.25 cm$^2$ or more.

The present invention will be explained with reference to the following specific examples. However, these examples are provided for illustrative purposes only and are not intended to limit the scope of the invention.

Example 1

The pin-to-plate type spark discharger illustrated in FIG. 1 was used in Examples 1-3 and a spark discharger with one tip was used in Comparative Examples 1-3.

The discharge chambers had a volume of 727 cm$^3$, an inner diameter of 11.5 cm, and a height of 7 cm. At least 16 pin electrodes were used, each of which had a diameter of 4 mm. The radius of curvature of each tip was approximately 0.13 mm. The outlet holes of the ground plate were formed corresponding to the respective pin electrodes and each had a diameter of 1 mm. The pin electrodes and the ground electrode were made of copper. The distance between both electrodes was adjusted to 2.5 mm. Nitrogen was used as a carrier gas. The flow rate of the carrier gas was adjusted to 0.03 m/s.

In an electric circuit for spark discharge, an HV (Bertan 205B, maximum voltage 10 kV) was connected in series with the pin electrodes through a 20 Mohm resistor. A capacitor with a capacity of 2 nF was connected in parallel with the electrodes. Experiments were done at different HV voltages of 4 kV, 5 kV, and 6 kV. Corona dischargers were operated at 4 kV.

Nanoparticles were deposited on a nanopatterned silicon substrate (6 cm×6 cm) through a photoresist perforated with holes having a diameter of 2 microns for 1 h 30 min.

An image of the resulting nanostructure array sample and a SEM image of the sample are shown in FIGS. 4(a) and 4(b) (HV voltage 4 kV).

Example 2

The procedure of Example 1 was repeated except that the flow rate of nitrogen was changed to 0.06 m/s.

Example 3

The procedure of Example 1 was repeated except that the flow rate of nitrogen was changed to 0.09 m/s.

Comparative Examples 1-3

Nanostructures were produced in the same manner as in Examples 1-3 (where the flow rates of nitrogen were different), except that a spark discharger with a single tip was used.

Experimental Results

The sizes of the nanostructures were measured using an SMPS with a differential mobility analyzer (DMA), a bipolar charger, a flow control system, a condensation particle counter (CPC), and a data inversion system. The shapes and sizes of the nanostructure arrays produced using the multi-spark discharge generator were measured using a field-emission scanning electron microscope (SUPRA 55VP).

Figure 4:
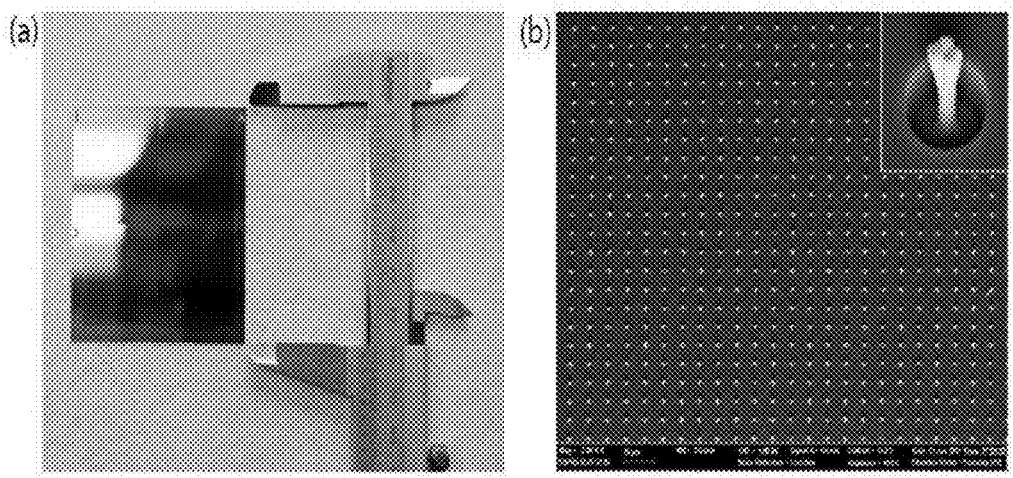
FIG. 4 shows (a) an image of a nanostructure array sample formed on a large area in accordance with an embodiment of the present invention, and (b) a SEM image of the sample.

FIG. 4 shows (a) an image of the nanostructure array sample formed on the large area in Example 1, and (b) a SEM image of the sample.

Figure 5:
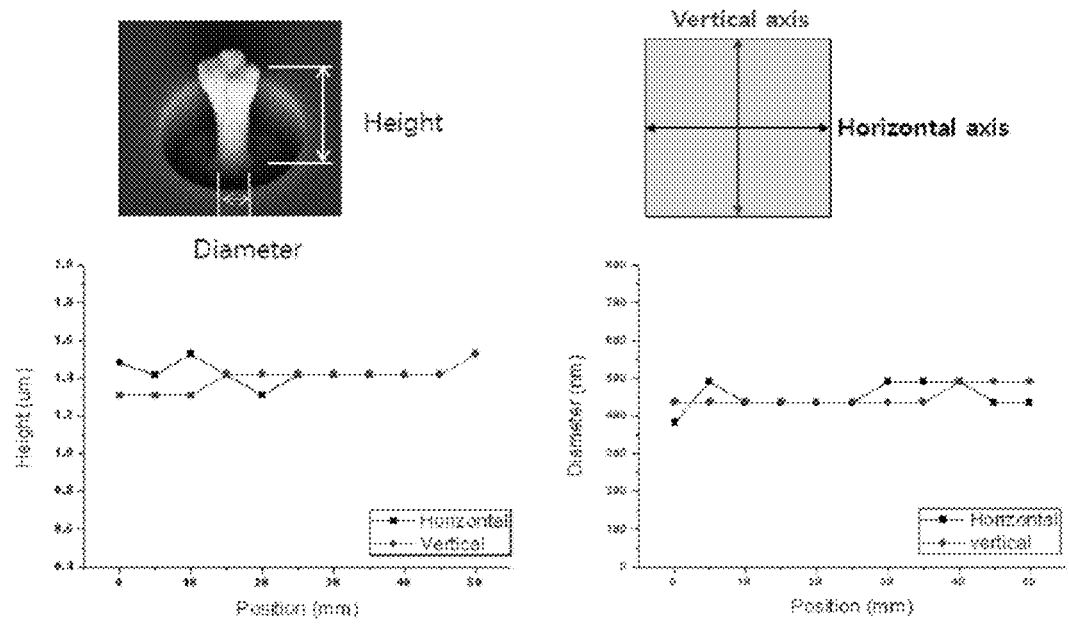
FIG. 5 shows variations in the size of a nanostructure array produced in accordance with an embodiment of the present invention at different positions on a substrate.

FIG. 5 shows the height and diameter distributions of the nanostructure obtained in Example 3 (voltage 4 kV). The produced nanostructures were found to have uniform distributions in vertical and horizontal directions even throughout the large area.

Figure 6:
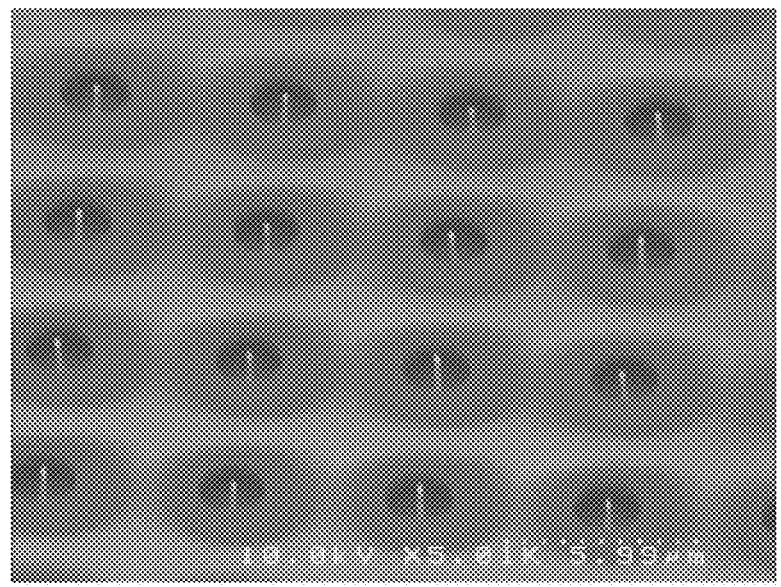
FIG. 6 is a SEM image of a comparative nanostructure array formed on a large area using a single-spark discharge generator.

FIG. 6 is a SEM image of the comparative nanostructure array formed on the large area using the single-spark discharge generator.

Figure 7:
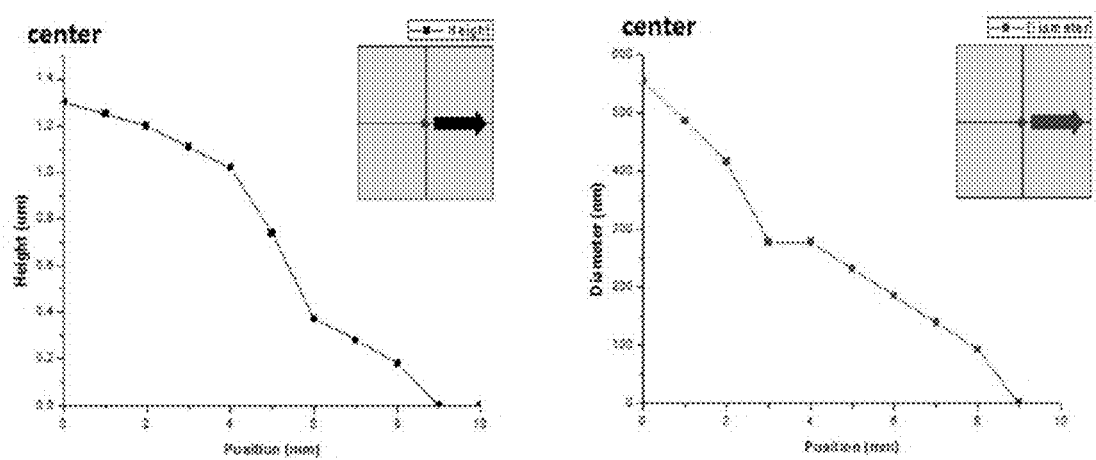
FIG. 7 shows variations in the size of a comparative nanostructure array measured at different positions on a substrate.

FIG. 7 shows variations in the size of the comparative nanostructure array measured at different positions on the substrate. The structures positioned farther away from the tip center were incompletely formed and were thus lacking uniformity.

Figure 8:
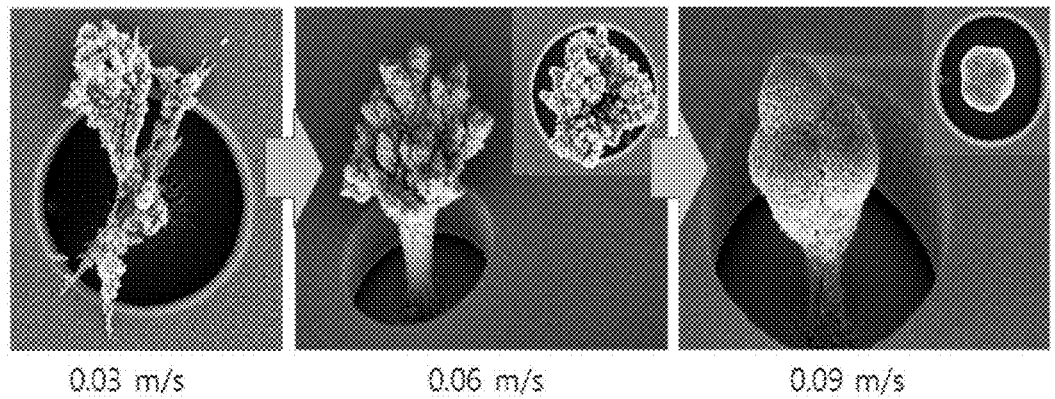
FIG. 8 shows images comparing the shapes of structures formed at different flow rates using a multi-spark discharge generator of the present invention (opening diameter of each photoresist is 2 microns).

FIG. 8 shows SEM images of the nanostructures obtained in Examples 1, 2, and 3 (voltage 4 kV). As the flow rate increased, aggregation of the particles decreased, making the structure surface smooth.

Figure 9:
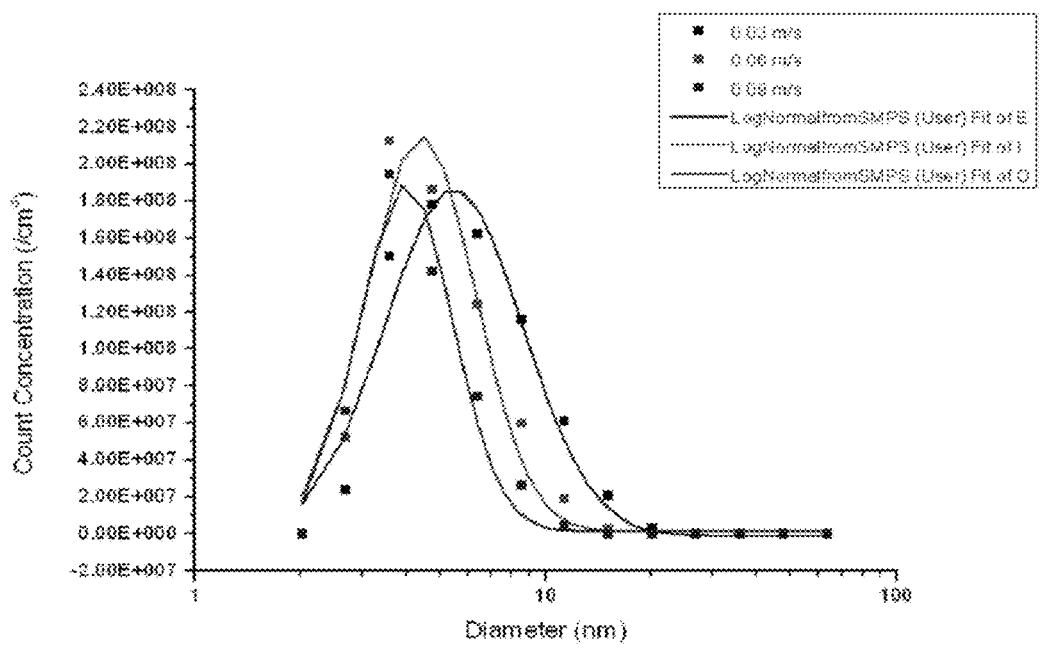
FIG. 9 is a graph showing the particle diameter distribution of structures formed at different flow rates using a multi-spark discharge generator of the present invention.

FIG. 9 shows the size distributions of the particles with varying flow rates at a voltage of 4 kV. As the flow rate increased, aggregation of the particles decreased, resulting in a reduction in the number of large particles. That is, the results of FIG. 9 demonstrate that aggregation of the particles can be controlled by varying the flow rate.

The invention claimed is:

1. A spark discharge generator comprising
a discharge chamber having gas inlets and outlets,
a plurality of columnar electrodes located in the discharge chamber,
a ground plate located in the discharge chamber and having a plurality of outlet holes at positions corresponding to the columnar electrodes, and
a substrate support located opposite the columnar electrodes and the ground plate.

2. The spark discharge generator according to claim 1, wherein each of the columnar electrodes has a tip whose shape is sharp, rounded or flat towards the corresponding outlet hole of the ground plate.

3. The spark discharge generator according to claim 2, wherein each of the tips of the columnar electrodes is spaced a predetermined distance from the corresponding outlet hole of the ground plate, is located at the same position as the corresponding outlet hole, or penetrates the corresponding outlet hole.

4. The spark discharge generator according to claim 2, wherein the tips of the columnar electrodes generate particles and ions simultaneously.

5. The spark discharge generator according to claim 1, further comprising corona dischargers at the gas inlets.

6. The spark discharge generator according to claim 1, wherein distance between the ground plate and the substrate support is adjustable.

7. The spark discharge generator according to claim 1, further comprising an inner cylinder capable of adjusting an inflow rate of gas at the gas inlets to control aggregation of particles.

8. The spark discharge generator according to claim 1, using a circuit comprising a plurality of resistors and a plurality of capacitors, as a constant high voltage source.

9. The spark discharge generator according to claim 1, wherein the discharge chamber comprises a window through which a user sees a spark discharge state.

10. A method for forming a three-dimensionally shaped nanostructure array comprising:
providing a spark discharge generator according to claim 1;
providing a substrate on the substrate support; and
using the spark discharge generator to provide a three-dimensionally shaped nanostructure array on the substrate.

* * * * *